US010579534B2

(12) United States Patent
Foster (10) Patent No.: US 10,579,534 B2
(45) Date of Patent: Mar. 3, 2020

(54) CACHING IO REQUESTS (71) Applicant: HEWLETT PACKARD ENTERPRISE DEVELOPMENT LP, Houston, TX (US)

(72) Inventor: Joseph E Foster, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 58 days.

(21) Appl. No.: 16/062,626

(22) PCT Filed: Dec. 21, 2015

(86) PCT No.: PCT/US2015/067016
§ 371 (c)(1),
(2) Date: Jun. 14, 2018

(87) PCT Pub. No.: WO2017/111891
PCT Pub. Date: Jun. 29, 2017

(65) Prior Publication Data
US 2018/0373637 A1 Dec. 27, 2018

(51) Int. Cl.
G06F 13/00 (2006.01)
G06F 12/0888 (2016.01)
G06F 12/0877 (2016.01)
G06F 12/0804 (2016.01)
(Continued)

(52) U.S. Cl.
CPC ...... *G06F 12/0888* (2013.01); *G06F 12/0804* (2013.01); *G06F 12/0871* (2013.01); *G06F 12/0873* (2013.01); *G06F 12/0877* (2013.01); G06F 2212/1021 (2013.01); G06F 2212/205 (2013.01)

(58) Field of Classification Search
CPC .. G06F 12/1081; G06F 13/28; G06F 12/0888; G06F 12/0804; G06F 12/0871; G06F 12/0873
See application file for complete search history.

(56) References Cited

U.S. PATENT DOCUMENTS 5,553,307 A * 9/1996 Fujii ................... G06F 12/0804
710/24
6,205,517 B1 * 3/2001 Sugaya ............... G06F 12/0848
710/52
7,480,784 B2 1/2009 Hummel et al.
(Continued)

OTHER PUBLICATIONS

Ziqi Fan, "H-ARC: A Non-Volatile Memory Based Cache Policy for Solid State Drives," 2014 30th Symposium on Mass Storage Systems and Technologies, MSST 2014. 11 pages.
(Continued)

Primary Examiner — Sean D Rossiter
(74) Attorney, Agent, or Firm — Hewlett Packard Enterprise Patent Department (57) ABSTRACT A computing device comprises a main memory, an input-output (IO) device, and an input-output memory management unit (IOMMU). The IOMMU may receive an upstream IO write request to the main memory from the IO device, and bypass caching the write request if the write request is within a first memory region of the main memory associated with a non-volatile memory. The IOMMU may cache the write request if the write request is within a second memory region of the main memory associated with a volatile memory.

14 Claims, 5 Drawing Sheets (51) Int. Cl.
G06F 12/0871 (2016.01)
G06F 12/0873 (2016.01)

(56) References Cited

U.S. PATENT DOCUMENTS

| | | |
|---|---|---|
| 7,487,327 B1 | 2/2009 | Chang et al. |
| 8,601,223 B1 | 12/2013 | Yuan |
| 8,775,752 B2 | 7/2014 | Yoshida et al. |
| 8,977,804 B1 | 3/2015 | Horn |
| 9,003,126 B2 | 4/2015 | Cai et al. |
| 2006/0236063 A1 | 10/2006 | Hausauer et al. |
| 2007/0168643 A1 | 7/2007 | Hummel et al. |
| 2010/0146157 A1* | 6/2010 | Choi ................ G06F 13/28 710/22 |
| 2010/0274962 A1* | 10/2010 | Mosek ............. G06F 12/0804 711/113 |
| 2013/0019081 A1* | 1/2013 | Moyer .............. G06F 12/1441 711/208 |
| 2013/0246690 A1* | 9/2013 | Haneda ............ G06F 12/0246 711/103 |
| 2013/0262736 A1 | 10/2013 | Kegel et al. |

OTHER PUBLICATIONS

PCT/ISA/KR, International Search Report and Written Opinion, dated Aug. 24, 2016, PCT/US2015/067016, 10 pages.

* cited by examiner

CACHING IO REQUESTS

BACKGROUND

Computing devices may comprise main memory comprising volatile memory, which loses its data in the event of a power loss. Increasingly, computing devices include non-volatile main memory, which does not lose its contents in the event of a power loss.

BRIEF DESCRIPTION OF THE DRAWINGS

Certain examples are described in the following detailed description and in reference to the drawings, in which.

DETAILED DESCRIPTION

A computing device may comprise a processor, such as a central processing unit (CPU). The CPU may be coupled with a memory management unit (MMU), which handles translation of virtual addresses to physical addresses and vice versa. The CPU may also be coupled with an input-output (IO) MMU (IOMMU). The IOMMU handles IO transfer requests to and from main memory of the computing device.

More particularly, the IOMMU may process IO requests from IO devices coupled a direct memory access (DMA)-capable bus, and from a processor, such as a CPU. As part of processing IO requests, the IOMMU maps virtual addresses that are visible to the IO devices (referred to as IO addresses) to physical addresses of main memory of the computing device. The IOMMU may also provide memory protection from faulty or malicious devices by restricting the addresses which an IO device may read or write.

IOMMUs do not currently distinguish between upstream writes (writes originating from an IO device and directed to system memory) directed to a non-volatile region of main memory or writes directed to volatile region of main memory. If an IO device attempts to write to a non-volatile region of main memory, the CPU may apply the same caching policy for writes to non-volatile memory as to volatile memory. More particularly, the CPU may cache both the upstream write data to an address associated with a non-volatile memory region and upstream writes to an address associated with a volatile region of main memory. Caching the upstream writes to non-volatile memory region may cause silent data corruption in the event of power loss.

This disclosure describes an IOMMU that determines between memory accesses to non-volatile memory and volatile memory regions. More particularly, an IOMMU of this disclosure may determine if an upstream memory access is associated with a non-volatile memory region, or a volatile memory region. The IOMMU may apply different caching policies for writes to a non-volatile region of main memory versus writes to a volatile region of main memory. For example, the IOMMU may disable or determine not to cache writes to a non-volatile memory region, and may enable caching of writes to a volatile region of main memory.

Figure 1:
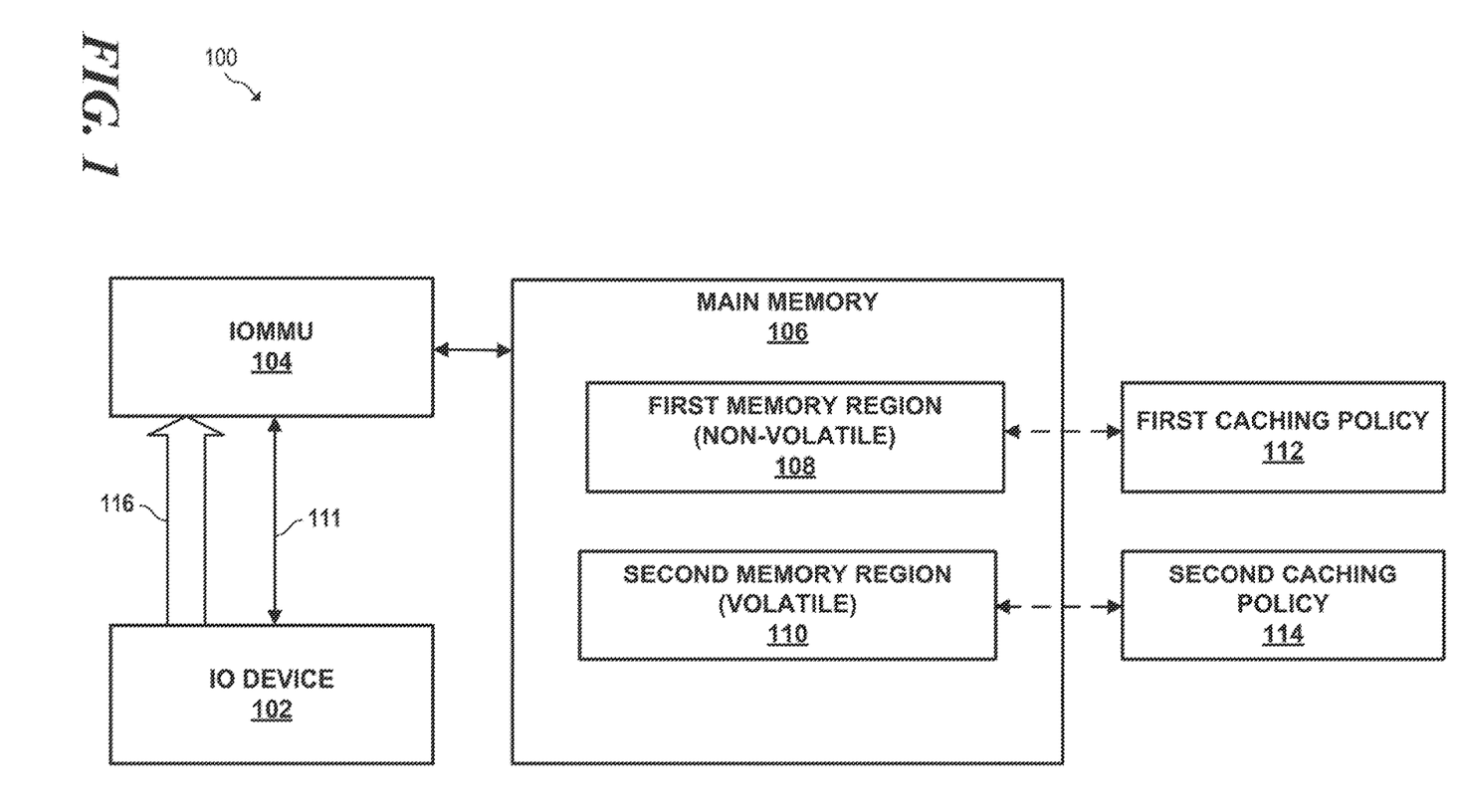
FIG. 1 is a conceptual diagram of an example computing device that may perform caching of IO requests.

FIG. 1 is a conceptual diagram of an example computing device that may perform caching of IO requests. Computing system 100 is illustrated in FIG. 1. Computing system 100 comprises IO device 102, IOMMU 104, and main memory 106. Main memory 106 comprises a first non-volatile memory region 108, and a second volatile memory region 110.

IO device 102 may comprise a device that is coupled with IOMMU 104 via a DMA-compatible bus or interconnect 111, such as Peripheral Component Interconnect Express (PCIe), PCI, Quickpath Interconnect (OPI). HyperTransport, or any other bus or interconnect that may be used to connect an IO device with a processor. IO device 102 may generate DMA read/write requests to/from Main Memory 106 via IOMMU 104 and bus 111. IO device 102 may comprise a DMA controller in various examples.

IO Device 102 may be for example, a device integrated into a motherboard, a PCIe card, such as a network card, graphics processing unit (GPU), or any other type of IO device that generates IO requests via bus or interconnect 111. IO device 102 may communicate with main memory 106 using DMA transfers. During a DMA transfer, a DMA engine of the IO device may initiate a memory transfer. The CPU may perform other operations while the transfer is in progress. When the transfer completes, the DMA engine may notify the CPU that the DMA transfer has completed.

To enable DMA transfers with IO device 102, IOMMU 104 grants IO device 102 permission to transfer data to and/or from a virtual address. When IO device 102 reads or writes data using a DMA transfer, a DMA engine of IO device 102 sends a DMA transfer request to the permitted virtual address. In the example of FIG. 1, IO device 102 generates DMA transfer requests, such as an upstream write request 116 via bus 111, and sends the DMA transfer requests to IOMMU 104. IOMMU 104 translates the virtual address of the DMA transfer requests to a corresponding physical address of main memory 106. IOMMU 104 transmits the DMA transfer requests to the translated physical address of main memory 106. IOMMU 104 may generally be coupled with a processor, such as a CPU. IOMMU 104 may be integrated or discrete from the processor in various examples.

Main memory 106 comprises a first non-volatile memory region 108, and a second volatile memory region 110. Main memory 106 may comprise more memory regions than those pictured in FIG. 1. First memory region 108 and second memory region 110 may comprise one or more memory chips or memory modules, such as dynamic inline memory modules (DIMMs). In the example of FIG. 1, main memory 106 receives an upstream write request from IOMMU 104. The upstream write request indicates a physical address. In the example of FIG. 1, the physical address may indicate that the DMA transfer request is within an address range associated with a first memory region 108 or second memory region 110. Based on the memory region associated with the transfer request, IOMMU 104 may apply different caching policies.

More particularly, and in examples of according to this disclosure, IO device 102 may generate an upstream write request 116. Upstream write request 116 may comprise a DMA transfer request to a particular virtual address to which IO device 102 has permission to transfer data. IOMMU 104 may receive upstream write request 116 from IO device 102. IOMMU 104 may apply applying a first caching policy 112 if write request 116 is within first memory region 108, which is associated with a non-volatile memory, and may apply a second, different caching policy 114 to write request 116 if upstream write request 116 is within second memory region 110, which is associated with a volatile memory. In various examples, first caching policy 112 may comprise bypassing, or determining not to cache write request 116, and second caching policy 114 may comprise caching write request 116.

Figure 2:
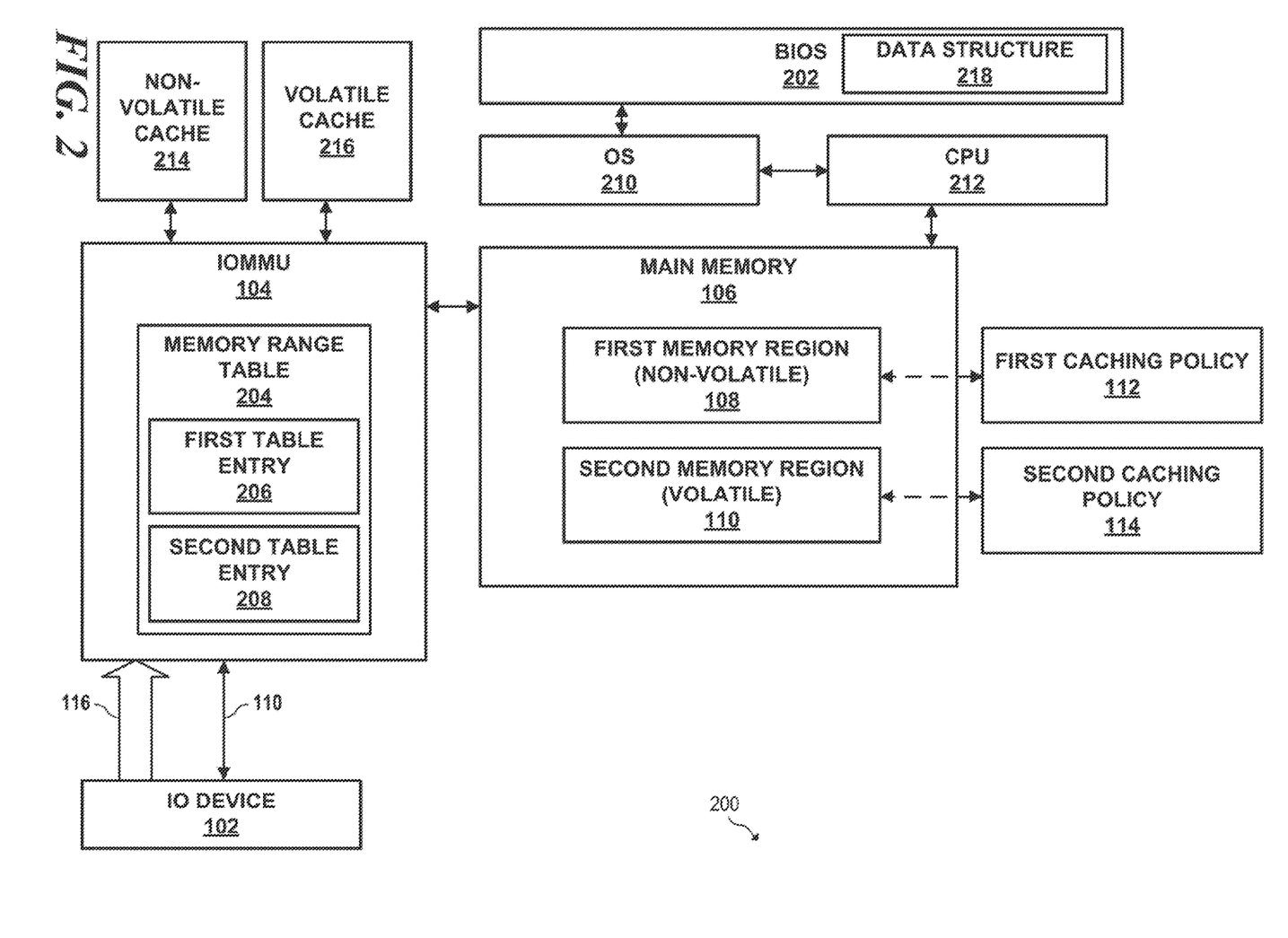
FIG. 2 is another conceptual diagram of an example computing device of an example computing system that may perform caching of IO requests.

FIG. 2 is another conceptual diagram of an example computing device that may perform caching of IO requests. FIG. 2 illustrates a computing system 200. In various examples, computing system 200 may be similar to computing system 100 (FIG. 1). Computing system 200 comprises BIOS 202, operating system (OS) 210, CPU 212, IOMMU 104, main memory 106, IO device 102, non-volatile cache 214, and volatile cache 216. IOMMU 104 comprises memory range table 204, which further comprises first table entry 206 and second table entry 208.

BIOS 202 may determine whether regions of main memory 106 are associated with a non-volatile memory region or a volatile memory region and may generate a data structure 218 that indicates the structure of main memory 106. For example, data structure 218 may indicate a number of memory modules present in main memory 106, and/or whether each of the memory modules is volatile or non-volatile, as well as other information related to the structure of the modules of main memory 106. BIOS 202 may pass data structure 218 to OS 210.

CPU 212 may be communicatively coupled with main memory 106, e.g. via a memory bus, such as a double data rate (DDR) bus. CPU 212 may issue and receive data from main memory 106 in response to DMA transfers, e.g. from upstream write request 116. In various examples, CPU 212 may comprise IOMMU 104.

CPU 212 may execute OS 210. OS 210 may comprise an operating system such as Windows, Linux, or the like. Based on the data structure 218 passed to OS 210, OS 210 may build memory range table 204. To build memory range table 204, OS 210 may add table entries to memory range table 204 based on whether data structure 218 indicates a particular memory region is volatile or non-volatile. Initially, OS 210 may store memory range table in main memory 106. OS 210 may populate memory range table 204 within IOMMU 104 in some examples. In some examples, memory range table 204 or entries of memory range table 204 may comprise descriptors that IOMMU 104 may page in and out of main memory 106.

In the example of FIG. 2, OS 210 may add first table entry 206, which corresponds to first non-volatile memory region 108. First table entry 206 indicates that first memory region 108 is non-volatile. OS 210 also adds second table entry 208, which corresponds to second volatile memory region 110. Second table entry 208 indicates that second memory region 110 is volatile. Memory range table 204 is illustrated as having two table entries for the purposes of example. Memory range table 204 may have more or fewer table entries in various examples.

In various examples, IOMMU 104, and/or main memory 106 may store memory range table 204. Each of the table entries of memory range table 204 may correspond to one or more memory addresses. For example, a table entry may have a starting address and an ending address, or multiple starting and ending addresses that correspond to multiple physical memory modules or memory chips.

As an example, based on memory range table 204, IOMMU 104 may determine that first memory region 108 is associated with a non-volatile memory, and second memory region 110 is associated with a volatile memory. Based on these determinations, OS 210 adds entries to memory range table 204. Each table entry of memory range table 204 may include an indication, such as a bit or value that indicates whether the particular table entry is associated with a volatile memory region or a non-volatile memory region.

OS 210 may detect changes associated memory allocation of main memory 106. For example, IOMMU 104 may determine that a memory region associated with a particular process has gone out of scope. Based on the change in memory allocation, OS 210 may update the entries of memory range table 204. Such changes may occur, for example in the case of virtual machines that may stop and start, and which may add and remove virtual devices. In various examples, OS 210 may update memory range table 204 responsive to detecting a change. As examples, OS 210 may update memory range table 204 by removing a table entry, adding a new table entry, or editing a table entry. OS 210 may edit a table entry, for example by changing a starting and/or ending address associated with a table entry.

Based on whether a table entry of memory range table 204 indicates a memory region is volatile or non-volatile, IOMMU 104 may apply a first caching policy 112, e.g. if a first memory region 108 is non-volatile, and a second caching policy 114, e.g. if the second memory region 110 is volatile. In various examples, the first caching policy 112 may cause IOMMU to cache upstream write request 116 is non-volatile cache 214. In some examples, second caching policy 114 may cause IOMMU 104 to cache upstream write request 116 in volatile cache 216.

Figure 3:
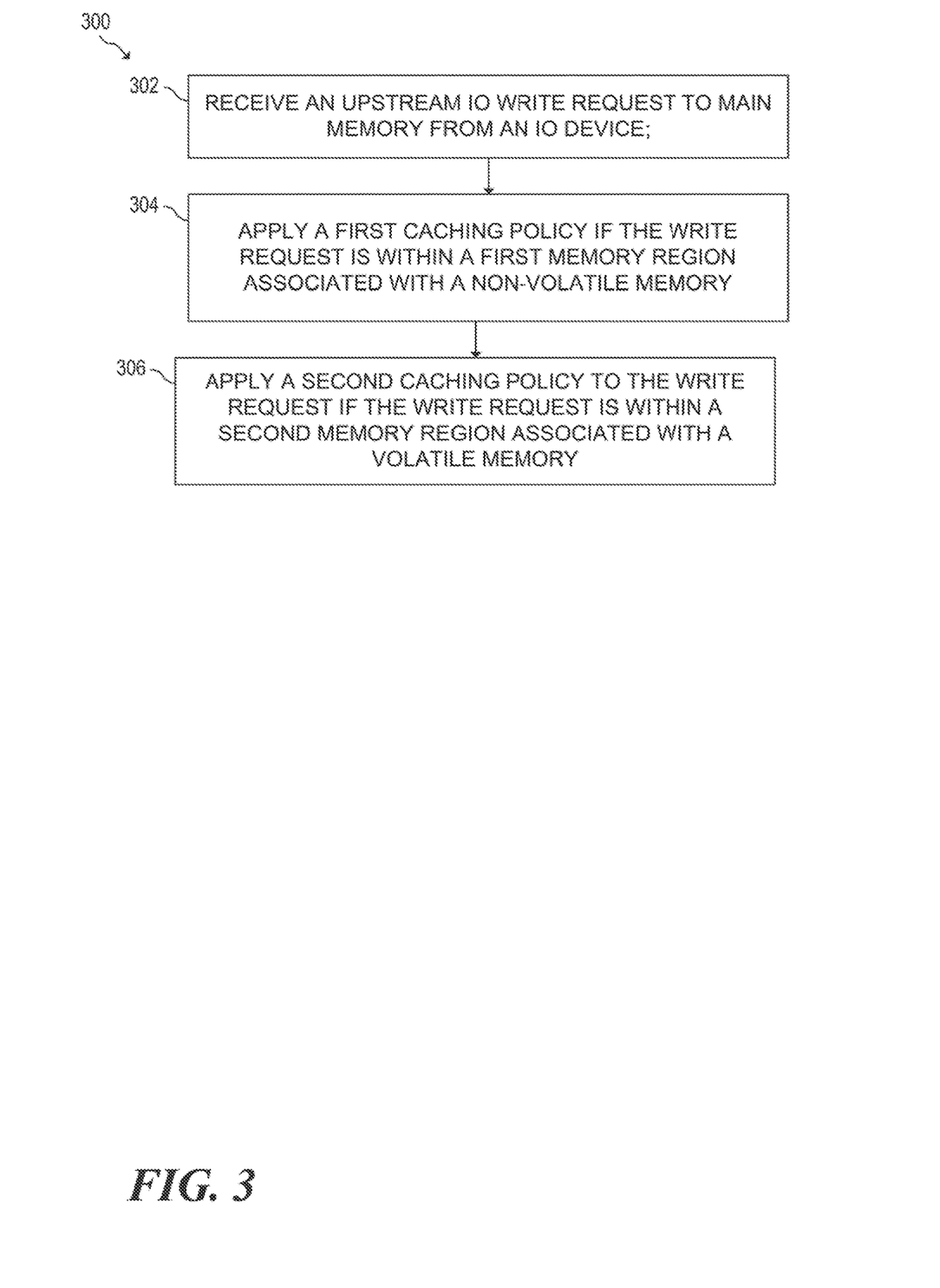
FIG. 3 is a flowchart of an example method for performing caching of IO requests.

FIG. 3 is a flowchart of an example method for performing caching of IO requests. Method 300 may be described below as being executed or performed by a system, for example, computing system 100 (FIG. 1) or computing system 200 (FIG. 2). In various examples, method 300 may be performed by hardware, software, firmware, or any combination thereof. Other suitable systems and/or computing devices may be used as well. Method 300 may be implemented in the form of executable instructions stored on at least one machine-readable storage medium of the system and executed by at least one processor of the system. Alternatively or in addition, method 300 may be implemented in the form of electronic circuitry (e.g., hardware). In alternate examples of the present disclosure, one or more blocks of method 300 may be executed substantially concurrently or in a different order than shown in FIG. 3. In alternate examples of the present disclosure, method 300 may include more or fewer blocks than are shown in FIG. 3. In some examples, one or more of the blocks of method 300 may, at certain times, be ongoing and/or may repeat.

Method 300 may start at block 302 at which point the computing system, e.g. computing system 100 may receive an upstream IO write request 116 to main memory 106 from an IO device 102. Method 300 may proceed to block 304 at which point IOMMU 104 may apply a first caching policy if the write request is within a first memory region of the main memory associated with a non-volatile memory. Method 300 may proceed further to block 306 at which point, IOMMU 104 may apply a second, different caching policy to the write request if the write request is within a second memory region of the main memory associated with a volatile memory.

Figure 4:
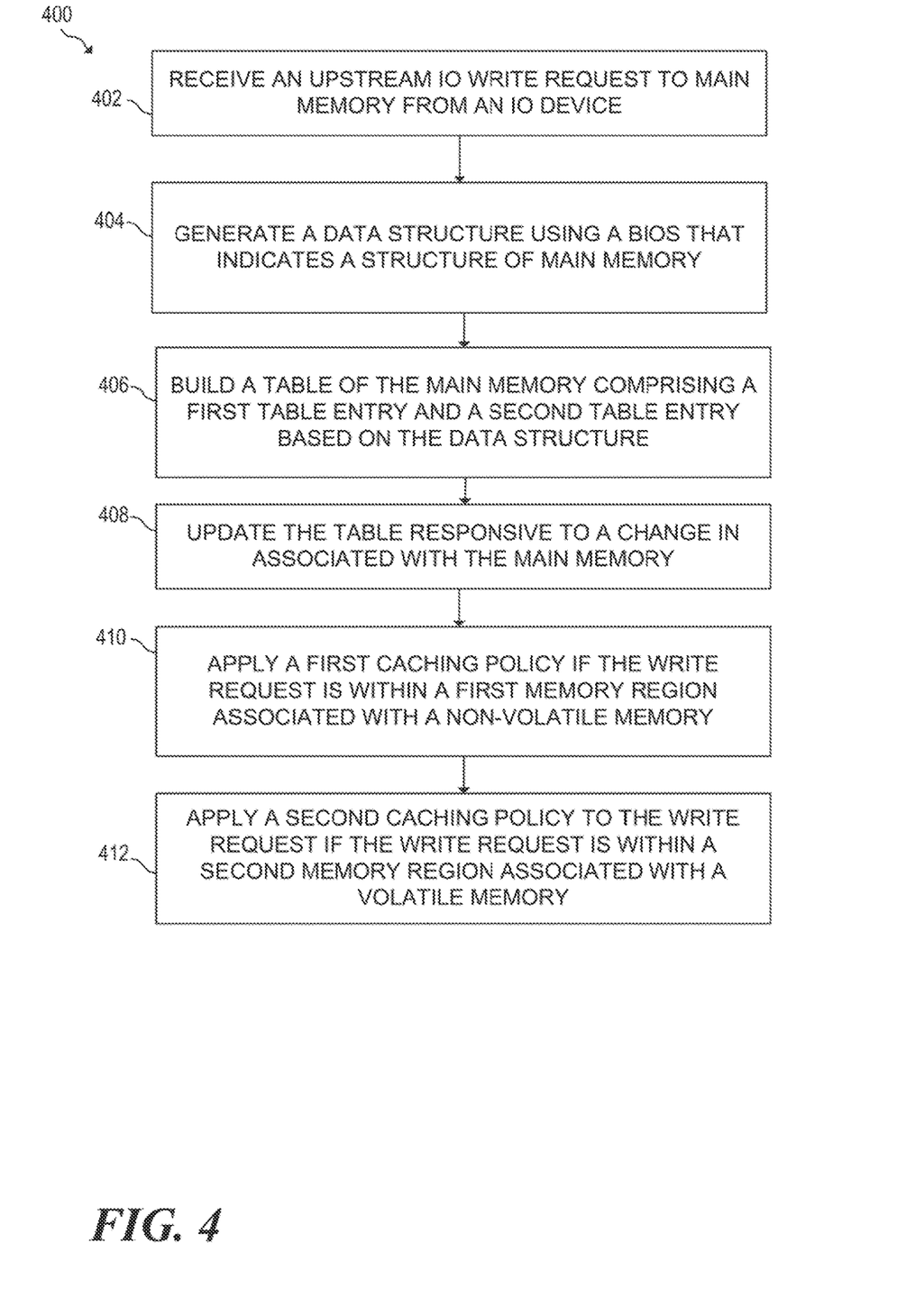
FIG. 4 is a flowchart of an example method perform caching of IO requests.

FIG. 4 is a flowchart of an example method for performing caching of IO requests. FIG. 4 illustrates method 400. Method 400 may be described below as being executed or performed by a system, for example, computing system 100 (FIG. 1) or computing system 200 (FIG. 2). Other suitable systems and/or computing devices may be used as well. Method 400 may be implemented in the form of executable instructions stored on at least one machine-readable storage medium of the system and executed by at least one processor of the system. Method 400 may be performed by hardware, software, firmware, or any combination thereof.

Alternatively or in addition, method 400 may be implemented in the form of electronic circuitry (e.g., hardware). In alternate examples of the present disclosure, one or more blocks of method 400 may be executed substantially concurrently or in a different order than shown in FIG. 4. In alternate examples of the present disclosure, method 400 may include more or fewer blocks than are shown in FIG. 4. In some examples, one or more of the blocks of method 400 may, at certain times, be ongoing and/or may repeat.

In various examples, method 400 may start at block 402 at which point may IOMMU 104 may receive an upstream IO write request 116 to main memory 106 from an IO device, e.g. IO device 102. In various examples, IO device may comprise a PCIe device.

Method 400 may continue to block 404 at which point BIOS 202 may generate a data structure, e.g. data structure 218, using a basic input output system (BIOS), e.g. BIOS 202. Data structure 218 may indicate a structure of main memory 106. Method 400 may continue to block 406, at which point OS 210 may build a table of main memory 106, e.g. memory range table 204, based on data structure 218, the table comprising first memory region 108 and a second memory region 110 using OS 210.

In various examples, first table entry 206 may indicate that a first memory region 108 is non-volatile, and second table entry 208 may indicate that a second memory region 110 is volatile. Method 400 may continue to block 408 at which point OS 210 may update memory range table 204 responsive to a change in a memory allocation main memory 106.

Method 400 may further continue to block 410 at which point IOMMU 104 may apply a first caching policy if the write request is within first memory region 108 of main memory 106, which is associated with a non-volatile memory. In some examples, the first caching policy 112 may comprise IOMMU 104 caching upstream write request 116 in non-volatile cache 214. In various examples, the first caching policy 112 may comprise IOMMU 104 determining not to cache upstream write request 116.

In some examples, method 400 may proceed to block 412 at which point IOMMU 104 may apply a second, different caching policy 114 to write request 116 if the write request 116 is within second memory region 110 of main memory 106, which is associated with a volatile memory. In some examples, the second caching policy may comprise caching upstream write request 116. To cache upstream write request 116, IOMMU 104 may cache upstream write request 116 in volatile cache 216.

Figure 5:
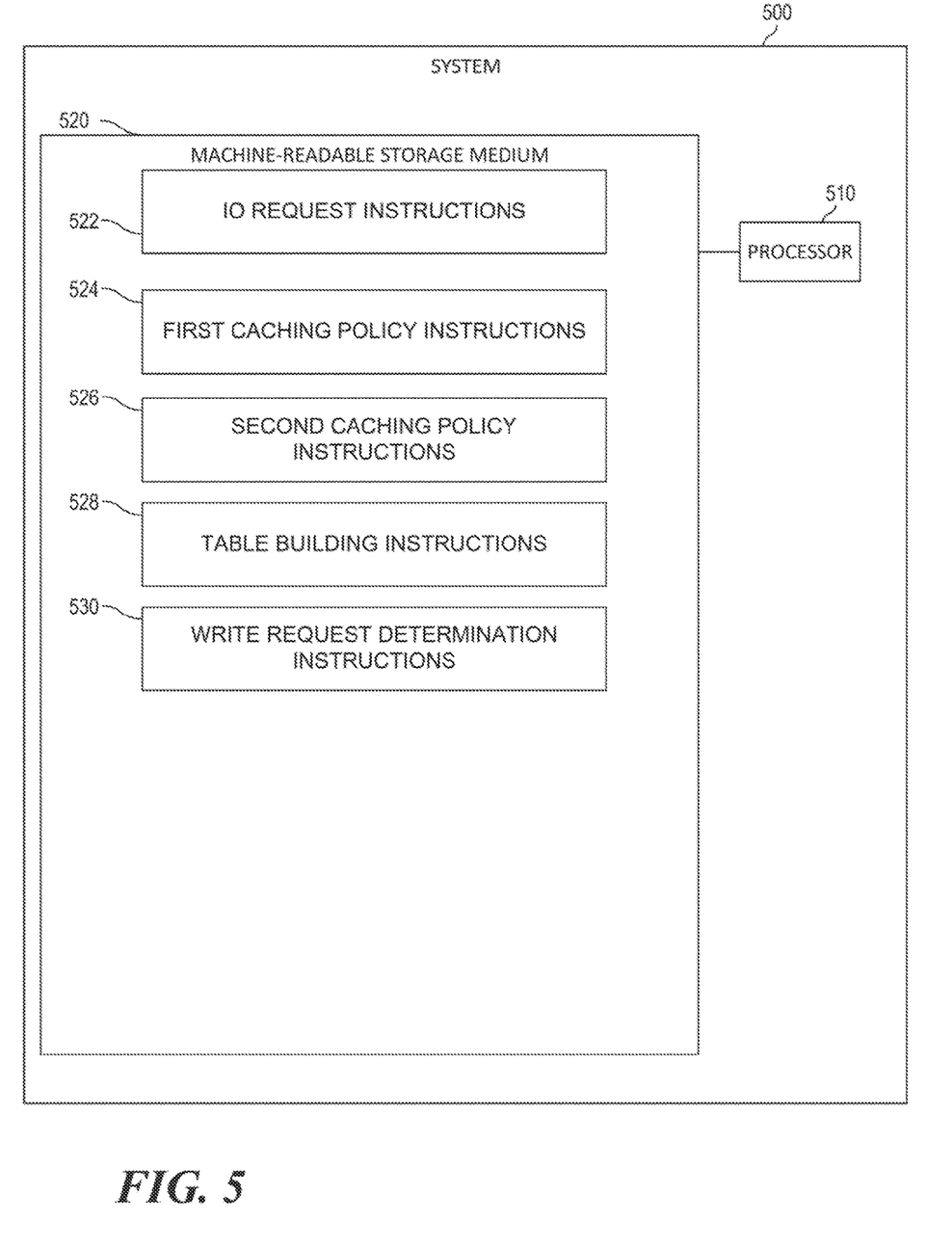
FIG. 5 is a block diagram of an example for performing caching of IO requests.

FIG. 5 is a block diagram of an example for performing caching of IO requests. In the example of FIG. 5, system 500 includes a processor 510 and a machine-readable storage medium 520. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 510 may be one or more central processing units (CPUs), microprocessors, and/or other hardware devices suitable for retrieval and execution of instructions stored in machine-readable storage medium 520. In some examples, processor 510 may comprise an IOMMU. In the particular example shown in FIG. 5, processor 510 may fetch, decode, and execute instructions 522, 524, 526, 528, to perform caching of IO requests.

As an alternative or in addition to retrieving and executing instructions, processor 510 may include one or more electronic circuits comprising a number of electronic components for performing the functionality of one or more of the instructions in machine-readable storage medium 520. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 520 may be any electronic, magnetic, optical, or other physical storage device that stores executable instructions. Thus, machine-readable storage medium 520 may be, for example, Random Access Memory (RAM), an Electrically-Erasable Programmable Read-Only Memory (EEPROM), a storage drive, an optical disc, and the like. Machine-readable storage medium 520 may be disposed within system 500, as shown in FIG. 5. In this situation, the executable instructions may be "installed" on the system 500. Alternatively, machine-readable storage medium 520 may be a portable, external or remote storage medium, for example, that allows system 500 to download the instructions from the portable/external/remote storage medium.

Referring to FIG. 5, IO request instructions 522, when executed by a processor (e.g., 510), may cause processor 510 receive an upstream IO write request 116 to main memory 108 from an IO device 102. In various examples, the IO device may comprise a PCIE device. First caching policy instructions 524, if executed, may cause processor 510 to determine not to cache write request 116 if the write request is within a first memory region 108 of the main memory associated with a non-volatile memory.

In various examples, first caching policy instructions 524 that cause processor 510 to determine not to cache the write request may further comprise instructions that cause the processor to determine not to cache the write request based on a table entry, e.g. first table entry 206 that indicates memory region 108 is associated with the non-volatile memory.

In some examples, processor 510 may execute second caching policy instructions 526 in various examples. Second caching policy instructions 526, if executed, may cause processor 510 to cache the write request 116 if the write request is within a second memory region 110 of the main memory 106 associated with a volatile memory.

In some example, second caching policy instruction 526 that cause processor 510 to cache the write request further comprise instructions that cause the processor 510 to determine not to cache the write request 116 based on a table entry, e.g. second table entry 208, that indicates the memory region is associated with the volatile memory.

In some examples, processor 510 may execute table building instructions 528, which, when executed, cause processor 510 to build a table comprising a first entry that indicates the first memory region is associated with the non-volatile memory and a second entry that indicates the second memory region is associated with the volatile memory. System 500 may further comprise write request determination instructions 530, which when executed, may cause processor 510, which may comprise IOMMU 104, to determine whether the write request is associated with the volatile memory or the non-volatile memory based on the table.

The invention claimed is:

1. A method for managing caching of an input-output (IO) requests, the method comprising: receiving an upstream IO write request to main memory from an IO device applying a first caching policy if the write request is within a first memory region of the main memory associated with a non-volatile memory; and applying a second, different caching policy to the write request if the write request is within a second memory region of the main memory associated with a volatile memory; wherein the first caching policy comprises determining not to cache the write request, and wherein the second caching policy comprises caching the write request.

2. The method of claim 1, wherein the first caching policy comprises caching the write request in a non-volatile cache if the write request is within the first memory region associated with the non-volatile memory.

3. The method of claim 1, wherein the second caching policy comprises caching the write request in a volatile cache if the write request is within the second memory region associated with the volatile memory.

4. The method of claim 1, further comprising:
building a table of the main memory comprising a first table entry and a second table entry,
wherein the first table entry indicates that the first memory region is non-volatile, and
wherein the second table entry indicates that the second memory region is volatile.

5. The method of claim 4, further comprising:
updating the table responsive to a change in a memory allocation of the main memory.

6. The method of claim 4, wherein building the table comprises
generating a data structure using a basic input output system (BIOS), wherein the data structure indicates a structure of the main memory; and
building the table based on the data structure using an operating system (OS).

7. A computing device comprising:
a main memory;
an input-output (IO) device;
an input-output memory management unit (IOMMU) to:
receive an upstream IO write request to the main memory from the IO device;
determine not to cache the write request if the write request is within a first memory region of the main memory associated with a non-volatile memory; and
cache the write request if the write request is within a second memory region of the main memory associated with a volatile memory.

8. The computing device of claim 7, further comprising a processor to execute an operating system (OS), the OS to:
build a table of the main memory comprising a first table entry and a second table entry,
wherein the first table entry indicates that the first memory region is non-volatile, and
wherein the second table entry indicates that the second memory region is volatile,
the IOMMU further to:
determine whether the write request is associated with the first memory region or the second memory region based on the table.

9. The computing device of claim 8, further comprising a basic input output system (BIOS), the BIOS to: generate a data structure that indicates a structure of the main memory, and wherein the OS to: build the table based on the data structure.

10. The computing device of claim 9, wherein the BIOS to: generate the data structure at boot time.

11. The computing device of claim 10 further comprising a volatile cache coupled with the IOMMU, wherein to cache the write request if the write request is within the second memory region, the IOMMU further to cache the write request in the volatile cache.

12. A non-transitory machine-readable storage medium encoded with instructions, the instructions that, when executed, cause a processor to:
receive an upstream IO write request to a main memory from an IO device;
determine not to cache the write request if the write request is within a first memory region of the main memory associated with a non-volatile memory; and
cache the write request if the write request is within a second memory region of the main memory associated with a volatile memory.

13. The non-transitory computer-readable storage medium of claim 12, further comprising instructions that, when executed, cause the processor to: build a table comprising a first entry that indicates the first memory region is associated with the non-volatile memory and a second entry that indicates the second memory region is associated with the volatile memory.

14. The non-transitory computer-readable storage medium of claim 12,
further comprising instructions that, when executed, cause the processor to: determine whether the write request is associated with the volatile memory or the non-volatile memory based on the table.

* * * * *